United States Patent [19]

Kondo

[11] Patent Number: 4,703,351

[45] Date of Patent: Oct. 27, 1987

[54] APPARATUS FOR AN EFFICIENT CODING OF TELEVISION SIGNALS

[75] Inventor: Tetsujiro Kondo, Kanagawa, Japan

[73] Assignee: Sony Corporation, Tokyo, Japan

[21] Appl. No.: 768,338

[22] Filed: Aug. 22, 1985

[30] Foreign Application Priority Data

Aug. 22, 1984 [JP] Japan .................................. 59-174412

[51] Int. Cl.$^4$ .......................... H04N 7/12; H04N 7/18
[52] U.S. Cl. .................................... 358/135; 358/105; 358/133
[58] Field of Search ................ 358/105, 133, 135, 136

[56] References Cited

U.S. PATENT DOCUMENTS

| 4,202,011 | 5/1980 | Koga . | |
|---|---|---|---|
| 4,278,996 | 7/1981 | Netravali et al. | 358/136 |
| 4,307,420 | 12/1981 | Ninomiya et al. | 358/105 X |
| 4,371,895 | 2/1983 | Koga | 358/136 |
| 4,437,119 | 3/1984 | Matsumoto et al. | 358/136 |
| 4,460,923 | 7/1984 | Hirano et al. . | |
| 4,498,102 | 2/1985 | Richard et al. | 358/136 X |

FOREIGN PATENT DOCUMENTS 2233795  1/1973  Fed. Rep. of Germany .

Primary Examiner—E. A. Goldberg
Assistant Examiner—Patrick W. Foster
Attorney, Agent, or Firm—Lewis H. Eslinger; Alvin Sinderbrand

[57] ABSTRACT

This invention relates to an apparatus for an efficient coding which reduces the number of bits per one pixel of digital television signals. The pixel data in the present field is predicted by way of a linear combination of the pixel data in the past several fields and parameters as prediction coefficients, and the parameters which make this prediction difference minimum are derived, and this parameter is transmitted.

10 Claims, 7 Drawing Figures

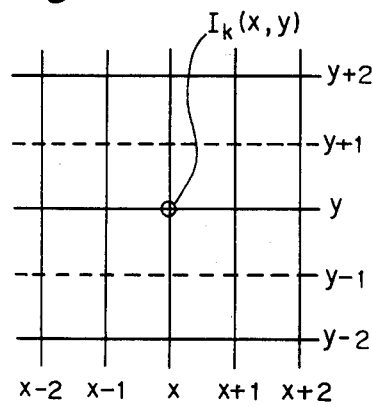
Fig. 3A
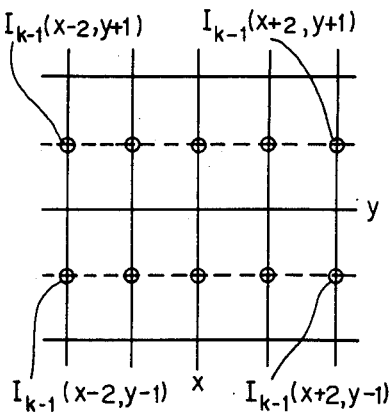
Fig. 3B
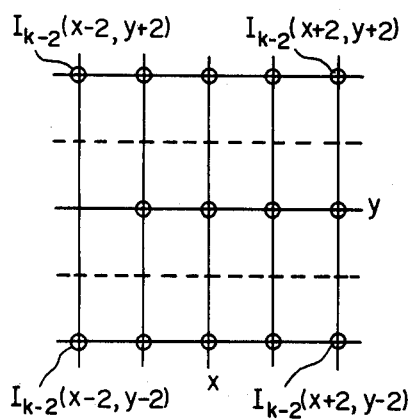
Fig. 3C
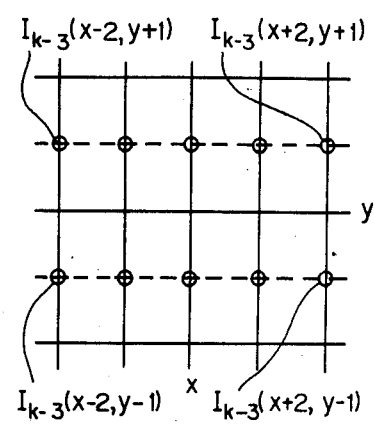
Fig. 3D
Fig. 4
```
        a  a  a  b  c  d
        a  a │a  b  c  d
        e  e │e  f │g  h
                   │
```

APPARATUS FOR AN EFFICIENT CODING OF TELEVISION SIGNALS

FIELD OF THE INVENTION AND RELATED ART STATEMENT

The present invention relates to an apparatus for an efficient coding of television signals.

As an efficient coding to reduce the number of bits per one pixel, a coding system between frames which performs a three-dimensional, namely, a time spatial process is known. The coding system between frames include a system by way of a moving detection and a system by way of a moving correction. In the former system, the moving detection is performed on the basis of the presence or absence of the frame difference and only the portion where there is no frame difference (namely, the portion where no movement exists) is replaced by the data in the previous frame.

In the latter system, the positional relation information (moving correction amount) between the present frame and the previous frame is obtained by way of a block matching method or the like, and the image in the previous frame is controlled on the basis of this moving correction amount and thereby deriving the correlation between the frames. The block matching method is a method whereby a screen is divided into a plurality of blocks and the moving amount and moving direction are obtained for every block and then these moving amount and moving direction are transmitted.

The coding system between frames by way of the moving detection has problems such that, in case of general moving pictures, there are a lot of moving portions and the compression factor is low.

On the other hand, the coding system between frames by way of the moving correction has drawbacks such that a distortion is caused due to the division into the blocks and the compression ratio is relatively low since the moving amount is transmitted for every block.

Further, any of these systems has a drawback such that a problem of what is called an uncovered background such that the pixel data in the original region is extinguished when a moving object moves is caused.

OBJECT AND SUMMARY OF THE INVENTION

It is therefore an object of the present invention to provide an apparatus for an efficient coding which can realize an extremely large compression factor as compared with a conventional apparatus.

Another object of the invention is to provide an apparatus for an efficient coding which can cope with various kinds of movements due to a plurality of moving objects by performing various kinds of corrections in the direction of time.

Still another object of the invention is to provide an apparatus for an efficient coding in which by performing various kinds of corrections in the direction of space, problems such as a faded edge portion, uncovered background and the like are not caused.

This invention relates to an apparatus for an efficient coding comprising: a memory to store pixel data in past several fields; means for identifying by way of, for example, a method of least squares the parameters to specify the time spatial relation which are defined by a linear combination from the pixel data in the present field and from the pixel data in a few past fields stored in the memory; and means for predicting the pixel data in the present field from the pixel data in the past several fields on the basis of the identified parameters, wherein these identified parameters are transmitted.

The invention intends to predict the present movement from the pixel data in past several fields. In this invention, since each moving information of a plurality of moving objects is included in the foregoing pixel data, namely, since moving vectors having various directions and speeds have a strong time-dependent correlation, there is no need to transmit the moving amount and it is sufficient to transmit only parameters (coefficients for prediction) for every one field, so that the average number of bits per one pixel can be made extremely small. In addition, in this invention, since the moving correction is handled as a time-dependent change of the level of each pixel, it can be integrally processed as a kinetic model such as a constant speed motion (which is expressed by the data in the past two fields) or a constant acceleration motion (which is expressed by the data in the past three fields) that does not depend on the direction or speed of the moving vector. Thus, it is enough to simply correct the deviation from the moving model. Therefore, according to this invention, the compression factor can be raised. Further, since the time-dependent and spatial correction is three-dimensionally performed, the problems such as a block distortion, an uncovered background and the like are not caused.

The above and other objects, features and advantages of the present invention will be more apparent from the following detailed description in conjunction with the accompanying drawings.

BRIEF DESCRIPTION OF THE DRAWINGS

FIGS. 3A, 3B, 3C, 3D and 4 are schematic diagrams which are used to explain the embodiment of the invention.

DETAILED DESCRIPTION OF THE PREFERRED EMBODIMENTS

Figure 1:
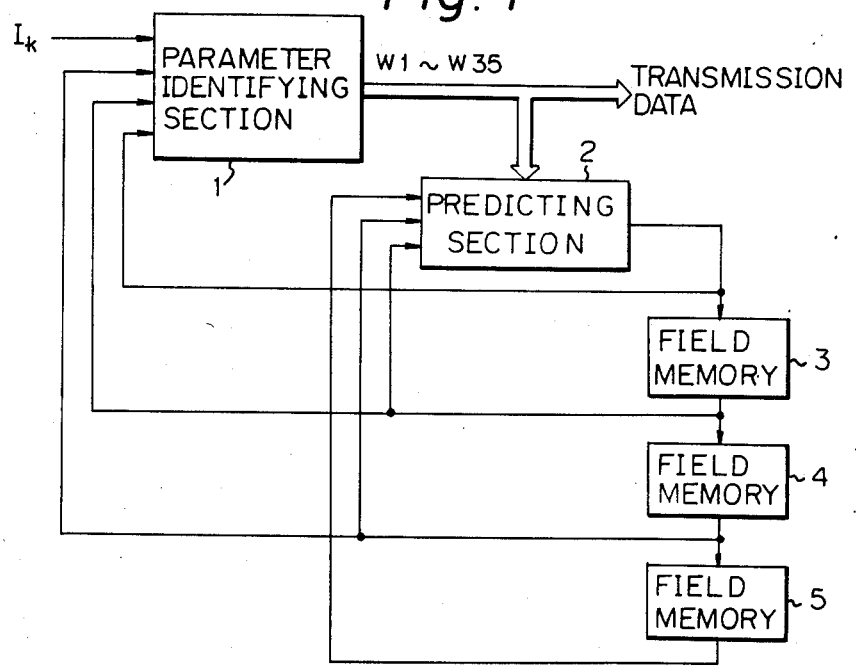
FIG. 1 is a block diagram of one embodiment of the present invention.
Figure 2:
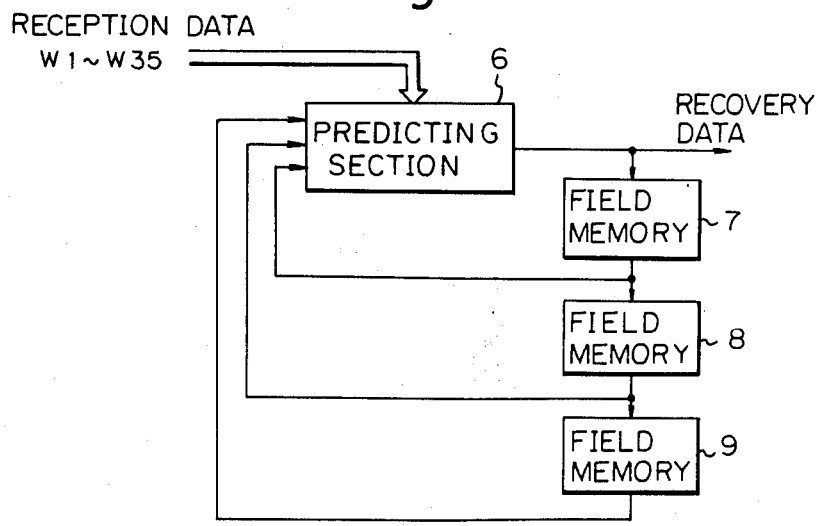
FIG. 2 is a block diagram showing an arrangement to receive the transmission data coded by the embodiment of the invention.

One embodiment of the present invention will now be described hereinbelow with reference to the drawings. FIG. 1 shows an arrangement of one embodiment of the present invention, namely, of a coding apparatus which is arranged on the transmission side. FIG. 2 shows an arrangement of a decoding apparatus which is arranged on the reception side.

In FIG. 1, a reference numeral 1 denotes a parameter identifying section. The digital television signals digitized by a predetermined sampling frequency, namely, the image data in the present field k is inputted to the parameter identifying section 1. Also, the image data in the previous field k-1, the image data in the further previous field k-2, and the image data in the further previous field k-3 are inputted to the parameter identifying section 1. These image data are the prediction data and the parameter identifying section 1 identifies thirty-five parameters $w_1$ to $w_{35}$ each consisting of, for example, eight bits for every one field using these prediction data and the data in the present field by way of a method of least squares. The parameter identifying section 1 includes a line delay circuit and a sample delay circuit to adjust the spatial positional relation. The parameters $w_1$ to $w_{35}$ identified by the parameter identifying section 1 are used as transmission data. The parameters $w_1$ to $w_{\pm}$ are parameters in the field k-1 which is delayed by one field with regard to the input data.

A numeral 2 indicates a predicting section and 3, 4 and 5 denote field memories, respectively. The prediction data from the predicting section 2 and written into the field memories 3 to 5. The image data (prediction data) in the past three fields k-1, k-2 and k-3 before the field k-1 are stored in those memories. The predicting section 2 obtains the prediction value with respect to the present pixel using the thirty-five prediction data and parameters $w_1$ to $w_{35}$ which are located near the pixel to be predicted and included in the past three fields. For this purpose, a plurality of line delay circuits and a plurality of sample delay circuits to adjust the spatial positional relation are also included in the predicting section 2.

The prediction value regarding the pixel data (FIG. 3A) in the present field k is derived as a linear combination of the total thirty-five pixel data consisting of the data (FIG. 3B) of ten pixels near the previous field k-1, data (FIG. 3C) of fifteen pixels near the further previous field k-2, and data (FIG. 3D) of ten pixels near the further previous field k-3.

In FIGS. 3A to 3D, the solid lines in the horizontal direction represent the lines which are scanned in the fields k and k-2. The broken lines in the horizontal direction indicate the lines which are scanned in the fields k-1 and k-3. It is assumed that the line at the location where the pixel data in the present field k is included is y, the line at the location over the line y is y+1, and the line at the position over the line y+1 is y+2. The lines at the locations under and below the line y are y−1 and y−2, respectively.

In FIGS. 3A to 3D, the solid lines in the vertical direction denote the sampling positions in each field. The sampling position which is one sampling before the sampling position x of the pixel data in the present field k is x-1, and the sampling position which is two samplings before the sampling position x is x-2, respectively. The sampling positions which are one and two samplings after the sampling position x are x+1 and x+2, respectively.

The prediction data $\hat{I}_k$ (x,y) regarding the present pixel is expressed by the linear combination based on the following equation.

$\hat{I}_k(x,y) = w1 \times \hat{I}_{k-1}(x - 2, y + 1) +$ $w2 \times \hat{I}_{k-1}(x - 1, y + 1) + w3 \times$ $\hat{I}_{k-1}(x, y + 1) + w4 \times \hat{I}_{k-1}(x + 1, y + 1) +$ $w5 \times \hat{I}_{k-1}(x + 2, y + 1) + w6 \times$ $\hat{I}_{k-1}(x - 2, y - 1) + w7 \times \hat{I}_{k-1}(x - 1, y - 1) +$ $w8 \times \hat{I}_{k-1}(x, y - 1) + w9 \times \hat{I}_{k-1}(x + 1, y - 1) +$ $w10 \times \hat{I}_{k-1}(x + 2, y - 1) +$ $w11 \times \hat{I}_{k-2}(x - 2, y + 2) + w12 \times \hat{I}_{k-2}(x - 1, y + 2) +$ $w13 \times \hat{I}_{k-2}(x, y + 2) + w14 \times \hat{I}_{k-2}(x + 1, y + 2) +$ $w15 \times \hat{I}_{k-2}(x + 2, y + 2) + w16 \times \hat{I}_{k-2}(x - 2, y) +$ $w17 \times \hat{I}_{k-2}(x - 1, y) + w18 \times \hat{I}_{k-2}(x, y) +$ $w19 \times \hat{I}_{k-2}(x + 1, y) + w20 \times \hat{I}_{k-2}(x + 2, y) +$ -continued $w21 \times \hat{I}_{k-2}(x - 2, y - 2) + w22 \times \hat{I}_{k-2}(x - 1, y - 2) +$ $w23 \times \hat{I}_{k-2}(x, y - 2) + w24 \times \hat{I}_{k-2}(x + 1, y - 2) +$ $w25 \times \hat{I}_{k-2}(x + 2, y - 2) +$ $w26 \times \hat{I}_{k-3}(x - 2, y + 1) + w27 \times \hat{I}_{k-3}(x - 1, y + 1) +$ $w28 \times \hat{I}_{k-3}(x, y + 1) + w29 \times \hat{I}_{k-3}(x + 1, y + 1) +$ $w30 \times \hat{I}_{k-3}(x + 2, y + 1) + w31 \times \hat{I}_{k-3} 196 (x - 2, y - 1) +$ $w32 \times \hat{I}_{k-3}(x - 1, y - 1) + w33 \times \hat{I}_{k-3}(x, y - 1) +$ $w34 \times \hat{I}_{k-3}(x + 1, y - 1) + w35 \times \hat{I}_{k-3}(x + 2, y - 1)$ The above predictive equation means that the prediction value regarding the pixel in the present field is obtained in a manner such that the close pixel having the strongest correlation is taken out as a representative value and the correction in the time spatial direction is performed to this representative value.

The parameter identifying section 1 identifies the parameters using the prediction data by way of a method of least squares. Namely, the true value $\hat{I}_k$ of a certain pixel in the present field is a value of which the difference e was added to the prediction value $\hat{I}_k$ of the pixel obtained from the above equation in correspondence to the true value $I_k$. Thus, the difference e becomes equal to $\hat{I}_k - I_k$ and the parameters $w_1$ to $w_{35}$ which make the square sum of this error minimum with regard to a predetermined number of pixels (namely, all pixels in one field) are calculated.

In this case, the highest precision can be derived by calculating the parameters $w_1$ to $w_{35}$ using all prediction pixels included in one field (for instance, 800×255 prediction pixels in the case where 800 pixels exist in one line and one field consists of 255 lines) by way of a method of least squares; however, the circuit scale becomes large. Therefore, the parameters $w_1$ to $w_{35}$ are identified using a predetermined number of, for instance, three hundred thinned-out representative pixels for every plurality of samples.

On the other hand, in the peripheral portion of the screen where no data exists, as shown in FIG. 4, it is assumed that the same data as data a to h in the screen exist out of the screen and these data may be substituted. Or as indicated by the broken lines in FIG. 4, the identification may be performed in the region which is located one line and two samples inside the peripheral portion of the screen.

As shown in FIG. 2, a decoding apparatus which receives the above-mentioned coded transmission data comprises field memories 7, 8 and 9; and a predicting section 6 to which the received parameters $w_1$ to $w_{35}$ are supplied and also the data in the past three fields are supplied from the field memories 7 to 9. The prediction data, namely, digital television signals are formed by the predicting section 6. To decode the digital television signals on the reception side, the initial data as many as three fields are transmitted prior to transmission of the parameters $w_1$ to $w_{35}$ and these initial data are written into the field memories 7 to 9, respectively.

The pixel data in the past two fields may be used with respect to the present field and, in such a case, a constant speed kinetic model is expressed as a three-dimensional kinetic model.

The identification of the parameters $w_1$ to $w_{35}$ which is executed by the parameter identifying section 1 will then be explained hereinbelow with regard to one example using a method of least squares.

The linear combination equation to calculate the prediction data $I_k(x,y)$ can be expressed by the following determinant in case of performing the prediction the overall present field.

$$\begin{bmatrix} \hat{I}_k(x_1, y_1) \\ \hat{I}_k(x_2, y_1) \\ \vdots \\ \hat{I}_k(x_1, y_2) \\ \hat{I}_k(x_2, y_2) \\ \vdots \\ \hat{I}_k(x_m, y_n) \end{bmatrix} =$$

$$\begin{bmatrix} \hat{I}_{k-1}(x_1-2, y_1+1) \ldots \hat{I}_{k-3}(x_1+2, y_1-1) \\ \hat{I}_{k-1}(x_2-2, y_1+1) \ldots \hat{I}_{k-3}(x_2+2, y_1-1) \\ \vdots \\ \hat{I}_{k-1}(x_1-2, y_2+1) \ldots \hat{I}_{k-3}(x_1+2, y_2-1) \\ \hat{I}_{k-1}(x_2-2, y_2+1) \ldots \hat{I}_{k-3}(x_2+2, y_2-1) \\ \vdots \\ \hat{I}_{k-1}(x_m-2, y_n+1) \ldots \hat{I}_{k-3}(x_m+2, y_n-1) \end{bmatrix} \begin{bmatrix} w_1 \\ w_2 \\ \vdots \\ w_{35} \end{bmatrix}$$

If this determinant is expressed simply by use of a matrix and a vector, it will be $$\hat{I} = \hat{I} \cdot W$$

where, $\hat{I}$ is a vector of the $(m \times n)$th order, $\hat{I}$ is a matrix of $(m \times n, 35)$, and W is a vector of the 35th order.

On the other hand, a vector I consisting of data (true values) in the present field which are arranged is a vector of the $(m \times n)$th order. Assuming that e is a differential prediction vector of the $(m \times n)$th order, the equation $$I = \hat{I} + e = \hat{I} \cdot W + e$$

is established. This equation becomes $$e = I - \hat{I} \cdot W$$

The parameters W which make the square sum of the differential prediction vector e minimum are derived. This equation is modified as follows.

$$e^T e = (I - \hat{I}W)^T (I - \hat{I}W)$$
$$= I^T I - I^T \hat{I} W - W^T \hat{I}^T I + W^T \hat{I}^T \hat{I} W$$

where, T is a transposed matrix.

In this equation, the parameters W which make $e^T e$ minimum satisfy the following equation derived by way of the formulae of mathematics.

$$\frac{\partial(e^T e)}{\partial W} = -\hat{I}^T I + \hat{I}^T \hat{I} W = 0$$

-continued
$$\therefore W + (\hat{I}^T \hat{I})^{-1} \hat{I}^T I$$

In case of all $(m \times n)$ pixels in one field, a very large matrix of $(m \times n, 35)$ is handled according to this equation, so that it is not practical. Therefore, the above equation is modified to a matrix and a vector of small orders and is processed. Namely, the matrix of $(35, 35)$ of $(P = \hat{I}^T \cdot \hat{I})$ and the vector 35th order of $(Q = \hat{I}^T \cdot I)$ are used.

$$P = \sum_{i=1 \text{ to } m} \sum_{j=1 \text{ to } n} \begin{bmatrix} \hat{I}_{k-1}(x_i-2, y_j+1) \\ \hat{I}_{k-1}(x_i-1, y_j+1) \\ \vdots \\ \hat{I}_{k-3}(x_i+2, y_j-1) \end{bmatrix} \cdot$$

$$[\hat{I}_{k-1}(x_i-2, y_j+1)\hat{I}_{k-1}(x_i-1, y_j+1) \ldots \hat{I}_{k-3}(x_i+2, y_j-2)]$$

$$Q = \sum_{i=1 \text{ to } m} \sum_{j=1 \text{ to } n} \begin{bmatrix} \hat{I}_{k-1}(x_i-2, y_j+1) \\ \hat{I}_{k-1}(x_i-1, y_j+1) \\ \vdots \\ \hat{I}_{k-3}(x_i+2, y_j+1) \end{bmatrix} \cdot \hat{I}_k(x_i, y_j)$$

The above P and Q are formed from the prediction data in the past three fields which are supplied to the parameter identifying section 1. The parameters W are calculated by $(P^{-1} Q)$.

The present invention intends to predict the present motion from the pixel data in the past several fields; therefore, there is no need to transmit the moving amount since each moving information of a plurality of moving objects is included in the pixel data. It is sufficient to transmit only the parameters (coefficients for prediction) for every one field. Thus, the average number of bits per one pixel can be extremely reduced. In addition, according to the invention, since the moving correction is handled as a time-dependent change of the level of each pixel, it can be integrally processed as a kinetic model such as a constant speed motion (which is expressed by the data in the past two fields) or a constant acceleration motion (which is expressed by the data in the past three fields) that does not depend on the direction or speed of the moving vector. Consequently, it is enough to merely and simply correct the deviation from the moving model and the compression factor can be raised due to the invention.

On one hand, since the time-dependent and spatial correction is executed three-dimensionally, the problems such as block distortion, uncovered background and the like are not caused.

Further, since the three-dimensional kinetic model is expressed by way of a linear combination, the parameters can be identified at a high speed by a simpler hardware as compared with the case where it is expressed by way of a non-linear high-order combination.

Although the present invention has been shown and described with respect to a preferred embodiment, various changes and modifications which are obvious to a person skilled in the art to which the invention pertains are deemed to lie within the spirit and scope of the invention.

What is claimed is:

1. An apparatus for efficiently coding television signals comprising:
   memory means for storing predicted pixel data for a plurality of past fields;
   means receiving true pixel data for a present field and connected to said memory means for identifying a plurality of non-pixel parameters to specify a time spatial relation which is defined by a linear combination of at least some of the true pixel data in the present field and at least some of said predicted pixel data in the past fields stored in said memory means;
   means for predicting new pixel data for said present field, each of said new pixel data being predicted from corresponding predicted pixel data for said past fields and the identified parameters, said new pixel data being stored in said memory means as predicted pixel data for a most recent field; and
   means for transmitting only said identified parameters.

2. An apparatus according to claim 1, wherein said memory means stores predicted pixel data for the past two fields.

3. An apparatus according to claim 1, wherein said means for identifying parameters includes an arithmetic operating circuit means for obtaining as said parameters those which make the square sum of the differences between predicted data for selected pixels in the present field and the corresponding true pixel data a minimum by a method of least squares.

4. An apparatus according to claim 1, wherein said means for transmitting is initially operative to transmit initial data corresponding to pixel data for a first few fields prior to transmitting said parameters.

5. An apparatus according to claim 1, wherein said memory means stores predicted pixel data for the past three fields.

6. An apparatus according to claim 5, wherein said means for identifying parameters calculates a vector W of said parameters from a matrix $I_k^{(t)}$ of true pixel data in said present field and three matrices $I_{k-1}$, $I_{k-2}$, $I_{k-3}$ of predicted pixel data in said three past fields by at least squared algorithm, wherein:
   each said matrix includes (m×n) data; and $$W = (I^T I)^{-1} I^T I(t)$$

7. An apparatus according to claim 6, wherein $$P = \sum_{i=1}^{m} \sum_{j=1}^{n} \begin{bmatrix} I_{k-1}(x_i - 2, y_i + 1) \\ I_{k-1}(x_i - 1, y_i + 1) \\ \cdot \\ \cdot \\ \cdot \\ I_{k-3}(x_i + 2, y_i - 1) \end{bmatrix} \cdot$$

$$[I_{k-1}(x_i - 2, y_i + 1), I_{k-1}(x_i - 1, y_j + 1), \ldots,$$

$$I_{k-3}(x_i + 2, y_j - 1)];$$

$$Q = \sum_{i=1}^{m} \sum_{j=1}^{n} \begin{bmatrix} I_{k-1}(x_i - 2, y_i + 1) \\ I_{k-1}(x_i - 1, y_i + 1) \\ \cdot \\ \cdot \\ \cdot \\ I_{k-3}(x_i + 2, y_i - 1) \end{bmatrix} \cdot$$

$$I_k(t)(x_i, y_i); \text{ and } \underline{W} = P^{-1}Q.$$

8. An apparatus according to claim 6, wherein W contains 35 parameters and n=m=35.

9. An apparatus according to claim 1, wherein the number of parameters is 35.

10. Apparatus for decoding a transmitted television signal, wherein prior to transmission said television signal was encoded into a plurality of non-pixel parameters specifying a time spatial relation defined by a linear combination of at least some true pixel data in a present field and at least some predicted pixel data in a plurality of past fields, said parameters only being transmitted to said apparatus for decoding, comprising:
   means for receiving the transmitted parameters;
   memory means for storing predicted pixel data for said past fields; and
   means for predicting new pixel data for said present field, each of said new pixel data being predicted from corresponding predicted pixel data for said past fields and the received parameters, said new pixel data being stored in said memory means as predicted pixel data for a most recent field.

* * * * *